United States Patent [19]
Whitaker

[11] Patent Number: 5,934,781
[45] Date of Patent: Aug. 10, 1999

[54] FIBER-OPTIC ILLUMINATION SYSTEM AND BEZEL FOR ACTIVE ILLUMINATION OF INSTRUMENTATION

[76] Inventor: William Kenneth Whitaker, 13043 Espinheira Dr., Cerritos, Calif. 90703

[21] Appl. No.: 08/897,817

[22] Filed: Jul. 21, 1997

[51] Int. Cl.$^6$ ................................................ G01D 11/28
[52] U.S. Cl. ............................... 362/26; 362/28; 362/554
[58] Field of Search ............................ 362/26, 28, 554, 362/581, 559

[56] References Cited

U.S. PATENT DOCUMENTS

| | | | |
|---|---|---|---|
| 4,128,859 | 12/1978 | Rietmuller | 362/26 |
| 5,226,105 | 7/1993 | Myers | 362/26 X |
| 5,436,805 | 7/1995 | Hsu et al. | 362/559 |

*Primary Examiner*—Stephen Husar
*Attorney, Agent, or Firm*—Curtis L. Harrington

[57] ABSTRACT

An integrated lighting system designed to evenly illuminate the instruments, switches, warning placards and checklists includes a fiber-optic ribbons held in place and adhered to one or more of three specially designed bezels. A first embodiment includes a bezel which fits over, for example, a relatively smaller 2¼ inch standard size instrument. A second embodiment of the bezel fits over a standard size 3⅛ inch instrument having no adjusting knobs which must be avoided. A third embodiment includes a bezel fits the 3⅛ inch instrument with the cut-out for adjusting knobs. A fourth embodiment includes a channel support for mounting a printed label and which supports the label and accommodates fiber tape between the channel support and printed label.

20 Claims, 5 Drawing Sheets

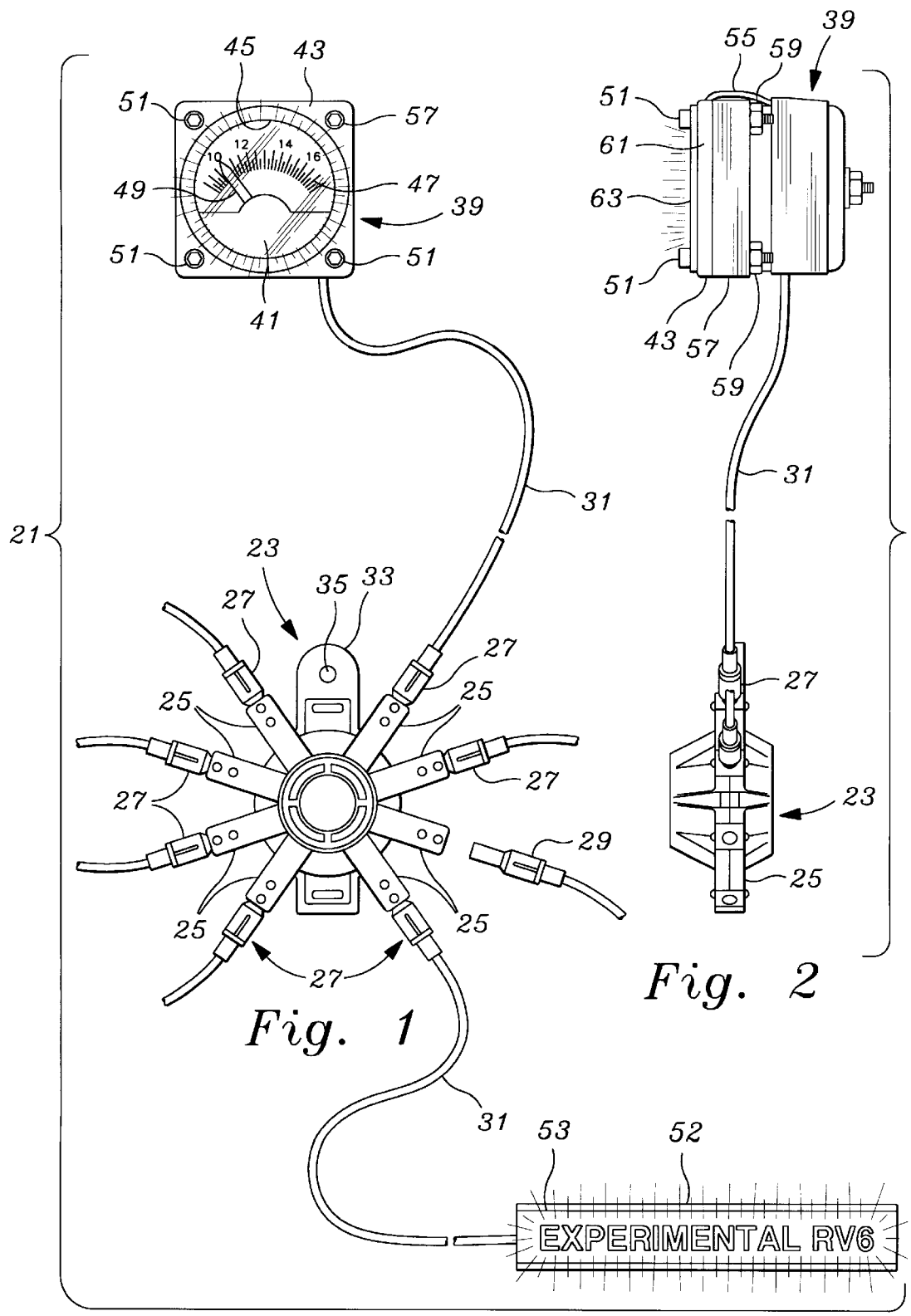

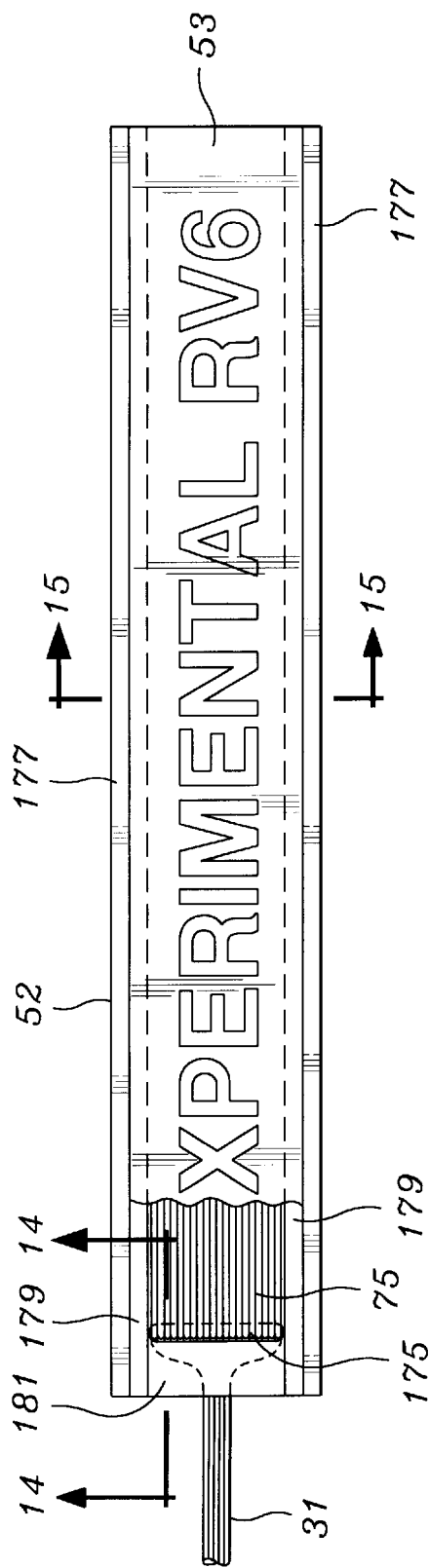
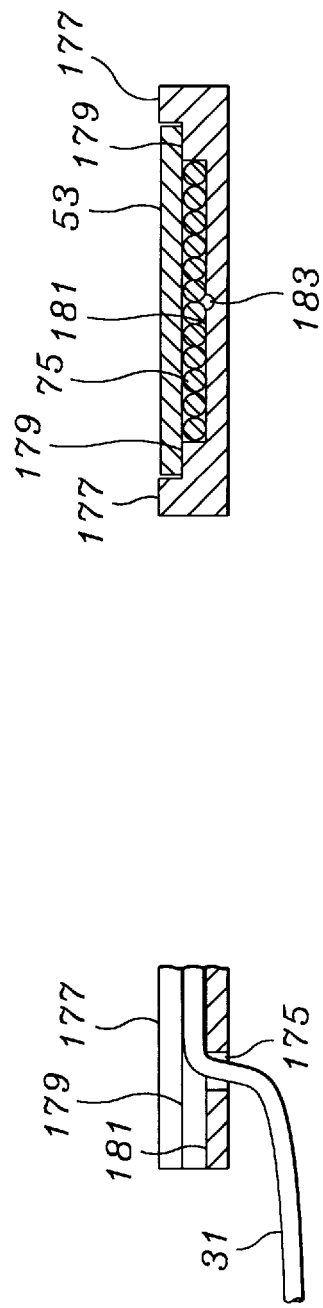
Fig. 13
Fig. 14
Fig. 15

FIBER-OPTIC ILLUMINATION SYSTEM AND BEZEL FOR ACTIVE ILLUMINATION OF INSTRUMENTATION

FIELD OF THE INVENTION

The present invention relates to improvements in structures and methods for illuminating aircraft instruments and especially instruments which do not carry or have a self lighting capability.

BACKGROUND OF THE INVENTION

Today's fleet of general aviation aircraft consist of primarily of airplanes that are 15–20 years old. The majority of single and light twin engine aircraft manufacturers discontinued production many years ago, with only a few recently coming back into the marketplace. Also, a high percentage of general aviation aircraft today are home built kit airplanes. Almost without exception, the instrument lighting on these aircraft is notoriously bad. The March 1996 publication of *The Aviation Consumer*, summed it up best in their article "Light to Fly By" by saying "Looking over the fleet, you'd think that airplanes are designed and apparently supposed to fly only in the daytime. Sure, the placard may say, "Day and night operations," but the night lighting is so shoddy that it's nearly worthless." pg. 19.

If any mode of transportation requires good instrument lighting for one's safety, flying is certainly it. Lighting products are abundant in aviation consumer catalogs. These products consist of flashlights to stick in your pocket, flashlights to attach to your headset and even flashlights to hold in your mouth while you fly. Dropping the flashlight between the seats can result in a panic. Experienced pilots have told stories of having passengers light matches while flying to illuminate instruments.

One of the reasons many aircraft instruments are not properly lighted, such as is seen in automobile dash panels, is that aircraft instruments give readings which are related to the change of air pressure. Most of the instruments are therefore, tightly sealed, and do not allow for having an internal lighting system in the instrument, especially one that has an easily replaced bulb. Internally lit instruments are available, but they are expensive ($100–$200 more) and replacing a bulb is difficult, time consuming and expensive.

Currently used methods to illuminate instruments include hard-mounted snaking lights which point back at the instrument panel, but which get in the way of the pilot and also spoil the aesthetic look of the original aircraft instrument panel. This is of particular concern for vintage aircraft, whose value and aesthetics are closely correlated. Other products which attempt to improve the lighting of instruments include post lights, which are very small lights that replace an instrument mounting screw. The wiring for post lights is very fine and fits inside a hollow-mounting screw housing, making the wiring very susceptible to electrical shorts. With this technique it is difficult to evenly light an instrument, and most instruments will require two or more post lights. This type of lighting system has a protruding lamp which also tends to get bumped and broken. Cross-threading the plastic assembly can be an installation problem and the cost of the system is approximately $40–$50 per miniature post assembly. Internally lighted instruments seem to be an attractive solution, but, as mentioned above, internally lighted instruments are expensive to purchase and when a bulb burns out, the instrument has to be removed and opened to replace the bulb, and re-calibrated if the pressure seal is broken, also expensive. Also, the quality of lighting varies from manufacturer to manufacturer, with lighting from different manufacturers creating a mis-match and a wide variety of illumination intensities. Other attempts to improve lighting include electroluminescent panels. Typically the cost to light a panel with this type of lighting is 20 percent of the cost of a new panel, a cost that is too prohibitive. Also, the illumination intensity of the electroluminescent panels' tends to diminish with age. The half-life of an electroluminescent panel is around 800 hours. Another more recent attempt to light instruments is with a product commercially available under the name, Nu-Light. The Nu-Light is an acrylic light wedge that fits between the instrument and the panel. Two small incandescent bulbs are imbedded in the top of the light-wedge. Sixty percent of the light is directed at the top half of the instrument. The Nu-Light does require special wiring for each instrument and the acrylic wedge is fragile and easy to crack during assembly. None of the above-mentioned lighting methods address the problem of illuminating switches, warning placards and safety checklist.

SUMMARY OF THE INVENTION

The inventive system is an integrated lighting system designed to evenly illuminate the instruments, switches, warning placards and checklists. The system utilizes fiber-optic ribbons held in place and adhered to one or more of three specially designed bezels that fit over aircraft instruments to illuminate the instrument's indicators, and a modified "U" shaped channel designed to hold a fiber optic ribbon and reverse printed label designed to illuminate wording used to mark switches, placards and checklists.

A first embodiment includes a bezel which fits over, for example, a relatively smaller 2¼ inch standard size instrument. A second embodiment of the bezel fits over a standard size 3⅛ inch instrument having no adjusting knobs to be accommodated. A third embodiment includes a bezel fits the 3⅛ inch instrument with the cut-out for adjusting knobs. Examples of these instruments include altimeters and directional gyros. A fourth embodiment, a modified "U" shaped channel can be of various widths and lengths is used for illuminated signage.

The bezels are attached to the front of the instrument and allows mounting in the normal fashion, the bezel then being sandwiched between the instrument and the instrument panel. A circular inner surface of the bezel is lined with a fiber-optic ribbon. The fiber-optic ribbon has been designed with a thirty inch lead that allows for an 8-port light source to be placed in an easily accessible location for very quick bulb replacement in a few seconds. Each of the eight ports is designed to accomodate an approximately half inch width equivalent of ribbon and thus can illuminate more than one instrument. For example, each of the eight ports can illuminate, one 3⅛ inch instrument, two 2¼ inch instruments, one 2¼ inch instruments and one or two nine inch labels. For another example, one 8-port light source can illuminate SIX 3⅛ inch instruments, THREE 2¼ inch instruments and one 9 inch label for placement over or under a set of switches. Each port has the capacity to accept up to ½ inch of single layer fiber-optic ribbon or ¼ inch of double layer fiber optic ribbon.

Significant advantages of this integrated lighting system include the following (1) Easier wiring with only one bulb hook-up per 8-port light source, (2) Less chance of an electrical short because only one connection is necessary and the wire used for the connection is of a larger diameter than existing lighting methods (NuLites and post lights), (3)

Fast 5-second bulb replacement in the easily accessed light source, (4) Improved safety because the bulb is more likely to be changed quickly in the event of a bulb failure due to the ease in changing the bulb and due to the fact that the change can be performed by the owner of the aircraft since no instruments have to be removed and recalibrated, (5) Attractive illuminated labels and placards that are backlit with fiber-optic ribbon. The custom reverse-printed labels can be printed for each user's specifications for a reasonable cost on an inkjet printer on an 0.008 inch thick backlit film. The reverse-printing process protects the ink from scratching and fading and allows for a non-glare front surface on the label, (6) The use of optical ribbons provide a uniform 360 degree or nearly 360 degree lighting of instruments and introduce no heat or electromagnetic interference to the instrument, (7) The light source can be connected to a low-cost rheostat for dimming, and (8) The fiber-optic ribbons can also be used to back light wording on reverse-engraved panel overlays if a reverse-engraved panel overlay is used instead of a stick-on label/placard.

BRIEF DESCRIPTION OF THE DRAWINGS

The invention, its configuration, construction, and operation will be best further described in the following detailed description, taken in conjunction with the accompanying drawings in which:

FIG. 1 is a plan schematic view illustrating a single source having eight optical outputs, one of which is shown connected to an instrument, and the other which is shown connected to a placard;

FIG. 2 is a side view of the light source and instrument shown in FIG. 1, but only illustrating the connection to the instrument;

FIG. 13 is a partially broken away view of a "U" shaped channel supporting both illumination optics and the overlying signage;

FIG. 14 is a view taken along line 14—14 of FIG. 13 which illustrates the entry of fibers into an elongate slot formed in the "U" shaped channel; and FIG. 15 is a transverse sectional view of the channel, fibers and signage, taken along line 15—15 of FIG. 13.

DETAILED DESCRIPTION OF THE PREFERRED EMBODIMENT

Figure 3:
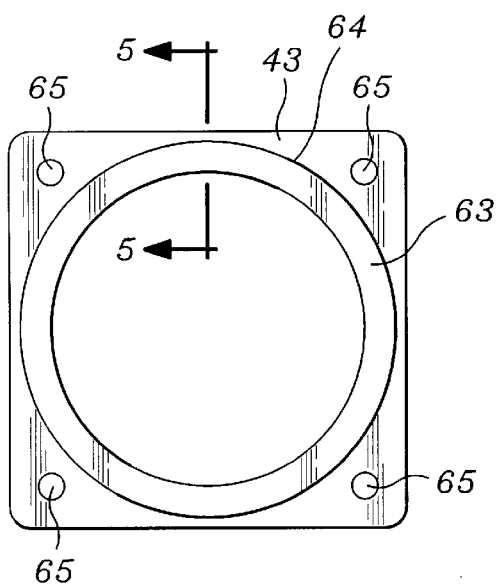
FIG. 3 is a front view of the relatively smaller first embodiment of the bezel of the present invention such as fits with a relatively smaller 2¼ inch standard size instrument.

The invention is best explained by beginning with a system approach as is depicted in FIG. 1. An illumination system 21 includes a light source housing 23 having eight output port arms 25. Seen inserted into the output port arms 25 are a series of optical connectors 27 and 29. One of the connectors 29 is seen detached from its output port arm 25 in order to show the portion at the end which is inserted into the output port arm 25. The connectors 27 and 29 are used for convenience and to simply provide a structure to collect the individual light fibers into a close bundle to facilitate focusing light into a fiber cable 31 connected to the connectors 27 and 29. At one end of the light source housing 23 is a hanger or attachment plate 33 having an attachment aperture 35 to facilitate easy and fast mounting of the housing 23 to any surface or hook.

Two fiber cables 31 are illustrated in FIG. 1 extending away from the light source housing 23. The upper cable 31 leads to a instrument 39 which may be any type of aircraft instrument, such as a meter, and is typically and especially an analog meter having a dial and background scale indicator against which the angular displacement of a dial or indicator needle, or some other physical structure may be measured. The instrument 39 will typically have a front glass surface 41 which marks the closest approach which can be made external to the instrument 39 with which the instrument 39 can be illuminated. At the front of the instrument 39 is a bezel 43 of the present invention which is used to support and partially shield the illuminated end (not seen in FIG. 1) of the fiber optic cable 31. The ray-type lines shown about the bezel indicate light rays leaving from within a central aperture 45 in the bezel 43, the light seen by the user of the system 21 is restricted as much as possible to come from light reflected from a scale 47 and an angularly displaceable indicator needle 49, and not directly from any of the light from a point applied to the scale 47 and needle 49. However, since the observer will not be directly in front of more than one instrument at a time, he will view the other instruments at an angle, and will be able to see some light directly from the illuminative portion of the fibers (not seen in FIG. 1) from the illumination system 21. A series of four mounting screws or bolts 51 are shown to hold the bezel 43 in place.

At the end of the other fiber cable 31 shown, a channel support 52 supports a printed label 53 is seen with the labeling "EXPERIMENTAL RV6", indicating an experimental aircraft. The channel support 52 is not strictly necessary, but is used to advantage in supporting the label 53 to prevent unevenness in application and to prevent the edges of the label from inadvertently becoming chipped or peeled away.

The area outside the lettering is black, and the area of the lettering is either clear or translucent white. The end of the cable 31 flattens into a tape or ribbon shape (not seen in FIG. 1), elongate and much wider than thick, which is applied against the rear of the wording area of label 53.

Referring to FIG. 2, a side view of the system 21 is shown, but with all of the connectors 27 removed except for one which is connected to the upper fiber cable 31 and to the instrument 39. In typical fashion, the cable 31 is brought up and around the instrument 39 where it can be wrapped or taped or otherwise anchored to the instrument 39. Any additional anchoring or wrapping will help to stabilize the fiber cable 31.

At the top of the instrument 39, a short piece of fiber 55, which may be a portion of cable 31 or a flattened portion of the fibers within the cable 31, or even a narrower portion. In any event, the piece of fiber 55 is configured to prepare its transition into the bezel 43, entering through a circumferential surface in the bezel 43. The fibers within the cable 31 may be a series of fibers arranged loosely. When the fibers extend to a point within the bezel 43 they are typically formed into a ribbon shape, where the individual fibers are arranged side by side. Further, the fibers are optically formed or treated or cut to give even illumination along their length. At the beginning of the portion exposed for illumination where the light is more intense in the fiber-optic fibers, a relatively smaller percentage of light is allowed to escape. Near the end of the portion exposed for illumination where the light is less intense, a higher proportion of the light is allowed to escape. In this manner, an even illumination is achieved.

The side view of instrument 39 shows the bolts 51, their extension through a front portion 57 of the instrument 39, and their being secured by nuts 59 just behind the front portion 57. The bezel 43 is seen as having a main portion 61, and a raised portion 63. As will be seen, the raised portion 63 has a circumferentially inwardly extending lip which will be shown to provide a correct degree of optical blockage, shielding light emitted from the optical ribbon from direct optical communication with an observer of the instrument 39, but not so blocking as to create a tunnel effect when viewing the instrument 39.

Referring to FIG. 3, the bezel 43 is shown as isolated from the instrument 39. The raised portion 63 is more readily seen, and raised portion 63 has a circumferentially outwardly facing surface 64 which will match the diameter of any ring on the instrument over which the bezel 43 fits, and as will be discussed further, below. A series of four through bores 65 are provided to accommodate the bolts 51 in mounting the bezel to the instrument 39. The area behind the raised portion, as will be seen, provides just enough space to (1) accommodate the front raised rim of the instrument 39, (2) provide a radial space in order to properly support as much of the axial extent of the cylinder of the optical ribbon shaped light emitting end of the optical fibers, the unsupported portion extending toward the front glass surface 41, and (3) provide a very thin lip adjacent the supported portion of the cylinder shape of optical ribbon, which shields a proper amount of the light emitting optical fibers from direct visual communication with the user when the user is immediately in front of the instrument 39.

Figure 4:
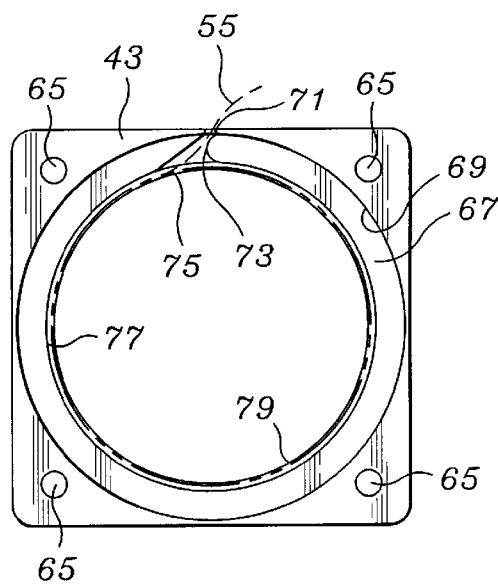
FIG. 4 is a rear view of the bezel of FIG. 3.

Referring to FIG. 4, a rear view of the bezel 43 illustrates the existence of an accommodation groove 67 which provides a space for a circular projection or ring (not yet seen) on the face of the instrument 39 to interfit with the bezel 43. Groove 67 has a radially inward surface 69, which will lie opposite the exterior of a ring on the face of the instrument 39. A rear view of the bezel 43 illustrates the entry of the short piece of fiber 55 shown in phantom. The short piece of fiber 55 will preferably enter as a bundle and before it has begun its transition to a ribbon shaped portion. Entry is accomplished through an entry port 71 formed in the main portion 61 of the bezel 43. The entry port 71 opens into a somewhat triangular shaped opening 73 which is slanted to one side, to accommodate the fiber ribbon 75 to fit against a radial surface 77 as the fiber ribbon 75 extends completely around the radial surface 77 and possibly overlapping, or approaching an overlapping position, in the vicinity of the triangular shaped opening. In some cases, the fiber ribbon 75 may be double layered within the bezel 43 for a brighter illumination. The view of FIG. 4 exposes the existence of a lip 79 which sits radially inwardly of the fiber ribbon 75.

Figure 5:
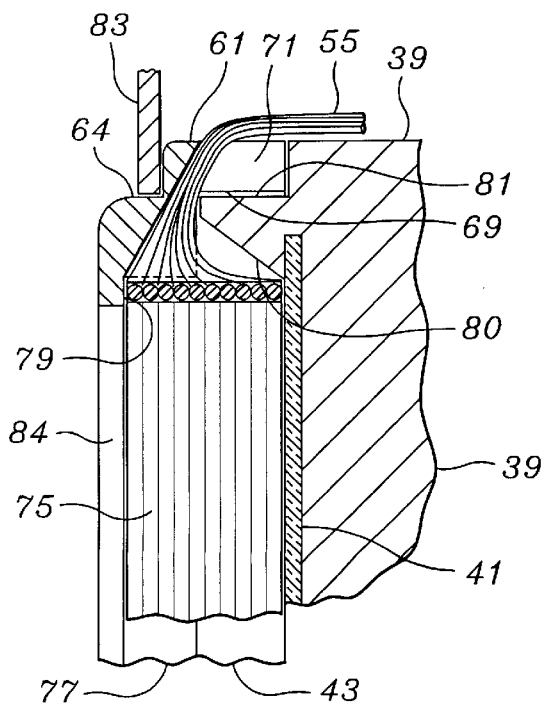
FIG. 5 is a view taken along section 5—5 of FIG. 3.

Lip 79 is as thin as possible without compromising the structural integrity of the bezel 43. Referring to FIG. 5, a sectional view along section 5—5 of FIG. 3 shows the details of the entry port 71, main portion 61, and raised portion 63. Note that the instrument 39 has a ring structure 80 which is shown as having a trapezoidal cross section, but which may also occur as a rectangular cross section. Ring structure 80 has an external surface 81 of a diameter which will match the external diameter of the circumferentially outwardly facing surface 64.

Normally, and before the introduction of the bezel 43, an instrument 39 is mounted in what is typically a round hole in an aircraft dash or instrument panel, a portion of which is identified with the numeral 83. The front portion of the instrument 39 is supported, especially vertically, by the front instrument panel plate 83. The instrument 39 is usually mounted by bringing it underneath the instrument panel plate and then forward with the ring structure 80 protruding through a matching aperture in the front instrument panel plate 83, the inside diameter of the matching aperture such that the diameter of the external surface 81 allows the ring structure 80 to closely fit within the matching aperture and to allow the ring structure to protrude through the matching aperture in the direction of the pilot.

The bezel 43 replicates the diameter of the external surface 81 with its circumferentially outwardly facing surface 64. In this manner, the bezel will protrude through the matching aperture and support the instrument in the same manner in which the ring structure 80 was supported by the front instrument panel plate 83, but through the intermediary structure of the bezel 43. The front instrument panel plate 83 supports the bezel 43 which is attached directly onto the instrument 39 through screws or bolts in the four through bores 65.

As can be seen in FIG. 5, only the raised portion 63 is seen on the side of the instrument panel plate 83 facing the pilot. The installation is thus economical in terms of conservation of support, and aesthetically pleasing since the material exposed is the raised portion 63 of the bezel 43. Especially where the ring structure 80 of the instrument may be worn, the bezel 43 provides an opportunity not only to illuminate the instruments 39, but to allow the selection of a finish for the instrument panel, since the bezel 43 can be made in any color or material, and can be finished with any metalic finish, if desired. The only adjustment to an instrument panel which need be made is a slight rearward mounting of the instrument 39 in its carriage behind the front instrument panel plate 83.

Note that the bezel 43 does not extend rearwardly of the front of the face of the instrument 39. This enables the bezel 43 to be used in instances where adjacent instruments 39 are tightly packed, and thus any lateral instrument 39 spacing present before installation can continue without added interference from the bezel 43.

Note also that the radial surface 77 supports the fiber tape 75, which curves into an abbreviated cylindrical shape, only partially along the axis of the fiber tape 75. Note that ideally, the edge of the fiber tape 75 extends as close as possible to and can touch the front glass surface 41. Also note that the edge of the fiber immediately adjacent the front glass surface 41 is also immediately adjacent the portion of the ring structure 80 which is radially inwardmost. Here it can be seen that the fiber tape 75 provides only a tiny additional amount of visual obstruction of the exposed front glass surface 41 equivalent to its radial thickness. As such, minimum visual obstruction is achieved, minimum disruption to the operation and fit of the instrument 39, and maximum benefits are obtained.

Also shown is the short piece of fiber 55 which enters the port 71 and flattens into the fiber ribbon 75, and begins its extension against the radial surface 77 adjacent the lip 79. The lip 79 may have a very abbreviated radial surface 81. Although it is shown as having a prominent surface in the expanded view of FIG. 5, the width of the radial surface 84 is quite thin and feels somewhat sharp to the touch.

Figure 6:
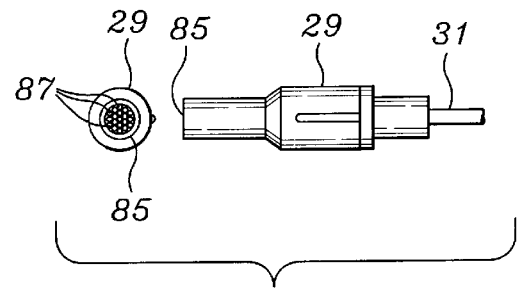
FIG. 6 is a view of the side and ends of a termination plug which is inserted into the central light source seen in FIGS. 1 and 2.

The fiber ribbon 75 can be commercially obtained from several sources. One such source is from Poly-Optical Products Inc., and sold under the name of UNIGLO fiber-optic ribbons. A source for the light source housing 23 is commercially available under the trademark name OPTI-BEAM®. Typically, the fiber cable 31 is nothing more than a series of loosely arranged individual fibers within a heat shrink tubing. Typically the fiber ribbon 75 is provided with a length individual fibers extending therefrom. These individual fibers may be fitted into a heat shrink tubing, which is seen as the outside of the cable 31 in FIGS. 1 and 2. Once the heat shrink tubing is slipped over the loosely arranged individual fibers, they may be inserted into a simple plastic connector 29 which is further seen in FIG. 6. Connector 29 is little more than a fitting which enables the individual fibers to be collected and cut in order to facilitate being brought into proximity with the light bulb within the light source housing 23. FIG. 6 illustrates an end 85 of the connector 29, and an array of tightly packed individual fibers 87 can be seen.

Figure 7:
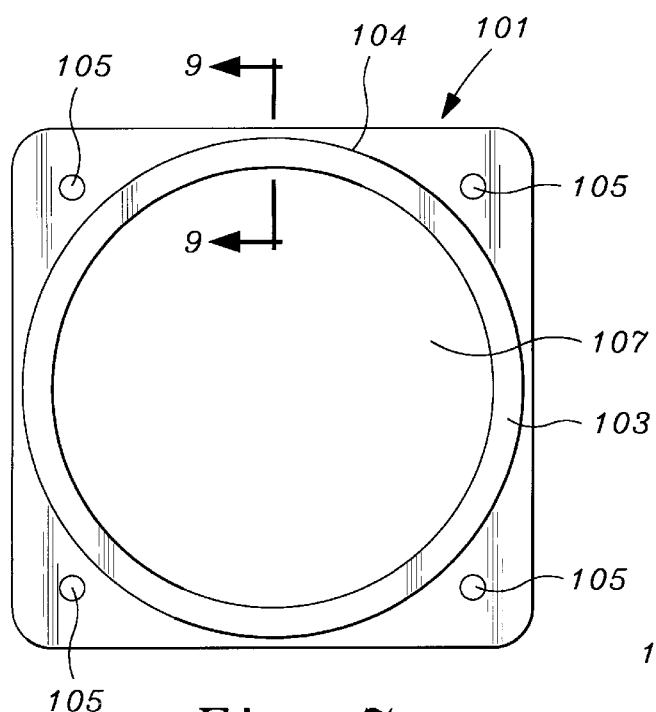
FIG. 7 is a front view of a second embodiment of the bezel as fits over a standard size 3⅛ inch instrument.

Referring to FIG. 7, a second embodiment of the bezel of the system 21 of the invention is seen as bezel 101. Again, the bezel 101 is shown as isolated from the instrument 39. Bezel 101 has a raised portion 103 which further has a circumferentially outwardly facing surface 104. Bezel 101 has a series of four through bores 105 are provided to accommodate the bolts 51 in mounting the bezel to the instrument 39. The raised portion 103 surrounds a central aperture 107.

Figure 8:
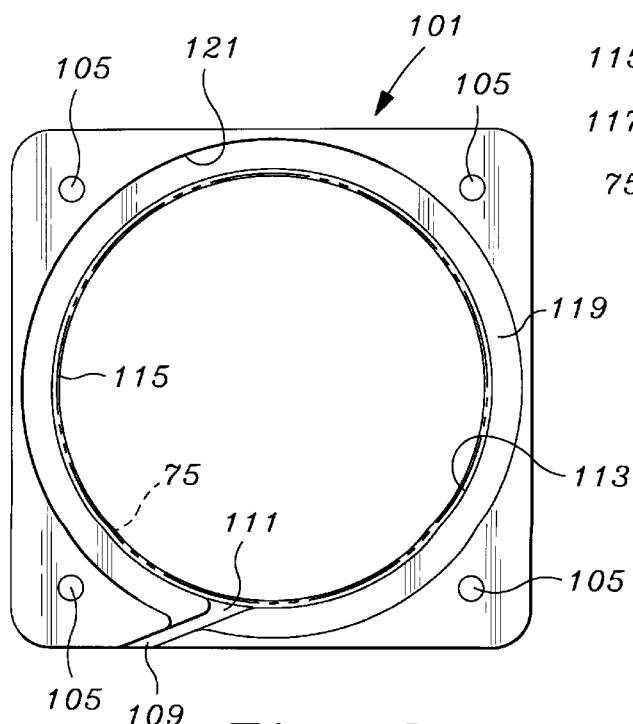
FIG. 8 is a rear view of the bezel of FIG. 7.

Referring to FIG. 8, a rear view of the bezel 101 illustrates an entry port 109 which opens into an opening 111. Note that the entry port 109 is more displaced with respect to the center line of the side of the bezel. Some manufacturers of 3⅛ inch instruments have a knob, in either the right or left corner, that protrudes into the inner surface of the bezel 101, invading the sight opening and interrupting the circumference of the bezel 101 where the fiber tape 75 would extend. This knob (not shown) would prevent a complete 360 degree wrap of the fiber-optic ribbon 75. The 3⅛ inch bezel was designed to maximize the amount of ribbon to light this instrument by offsetting the fiber-optic entry groove in the bezel close to such an invasive knob, allowing for the fiber-optic ribbon to begin at one edge of the knob and ending on the opposite side of the knob, maximizing the periphery of the bezel 101 supporting fiber ribbon 75 and therefore minimizing the amount of lost light due to absence of the fiber-optic ribbon.

Since light is emitted out of the narrow edge of the fiber-optic ribbon, a 0.040 inch lip 115 was designed to cover the edge of the fiber-optic ribbon 75. Further, bezel 101 should be made of a tough, durable material with a very attractive appearance. The result is a system 21 which includes bezel 101 which is designed around a fiber-optic ribbon that would produce a visually pleasing amount of light on the instruments.

Figure 9:
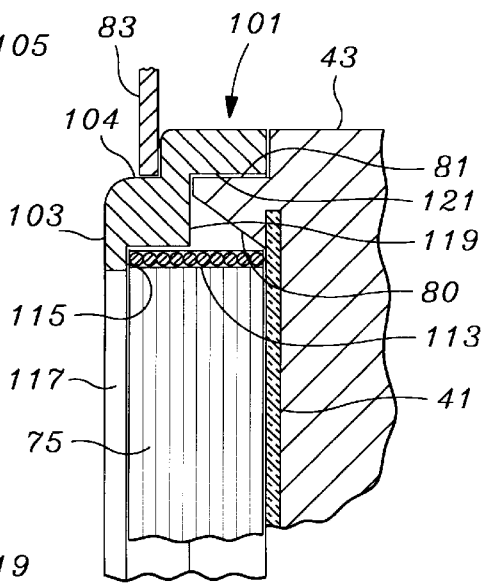
FIG. 9 is a sectional view of the bezel of FIGS. 7 and 8 taken along section 9—9 of FIG. 7.

The fiber ribbon 75 is seen in phantom only about the periphery of a radial surface 113 in which it rests, and which is radially outward of a lip 115. Lip 115 has an inner most radial surface 117, which is best seen in FIG. 9. An accommodation slot 119 is seen, which will accommodate a ring shaped projection of the instrument 39 and provide a close fit. Slot 117 has an adjacent radially inwardly directed surface 121.

Referring to FIG. 9, a sectional view taken along line 9—9 of FIG. 7 illustrates the internal aspects of the bezel 101, including the radially inwardly directed surfaces 121, 113, and 117, as well as the radial surface 119, and the lip 115. As was the case earlier, the bezel 101 fits through and is supported by the front instrument panel plate 83, in the same fashion as was described for bezel 43.

Figure 10:
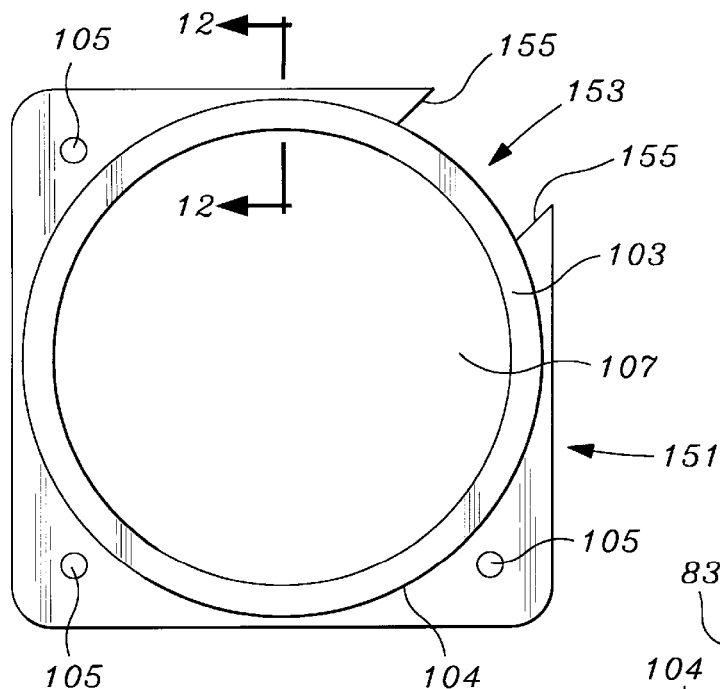
FIG. 10 is a front view of a third embodiment of the bezel which approximately fits over a standard size 3⅛ inch instrument and which has a sectional cutout to accommodate an instrument knob.

Referring to FIG. 10, a sectional view of a bezel 151 is illustrated, and which has an open slot 153 at one corner of the bezel 151. The open slot has a pair of parallel sides 155 to account for and accommodate an instrument setting or operation knob (not shown). As such, the bezel 151 has only three bores 105 with which to support an attachment to the instrument 39. It only has ¾ of the support it would otherwise have. In all other respects, the remaining structures on bezel 151 are identical with those of bezel 101 and are consequently labeled with the same numbering.

Figure 12:
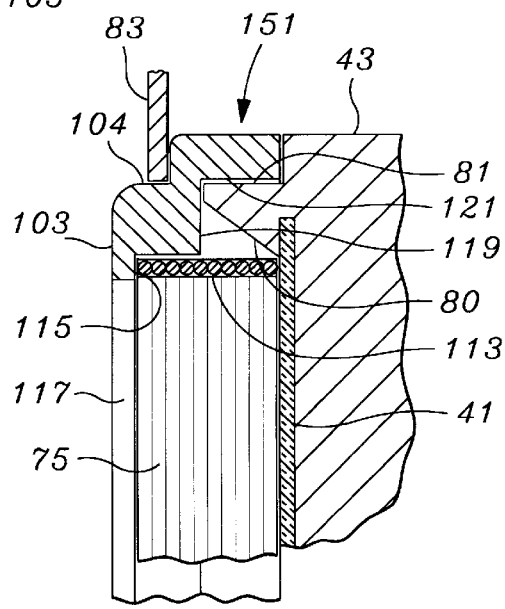
FIG. 12 is a sectional view taken along line 12—12 of FIG. 10.
Figure 11:
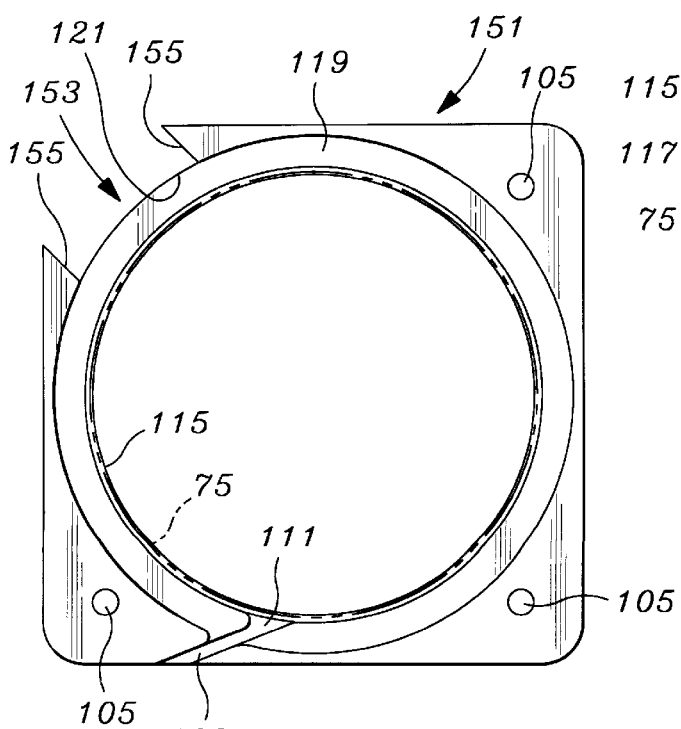
FIG. 11 is a rear view of the bezel of FIG. 10.

Referring to FIG. 11, a rear view of the bezel 151 illustrates the same structures as was seen for bezel 101, except for details of how the open slot 153 and pair of parallel sides 155 interact with the radially inwardly directed surface 121. Referring to FIG. 12, and as was the case earlier, the bezel 151 fits through and is supported by the front instrument panel plate 83, in the same fashion as was described for bezels 43 and 101.

The bezels 43, 101 & 151 are important to the system 21 and to make it usable on aircraft instruments. The bezels 43, 101 & 151 had to fit over the ring which typically exists on most all instruments. The surfaces 63, 119 must then be only slightly extended radially inwardly to help hide the edge of the fiber tape 75, but without overly restricting viewing access to such areas. The bezels 43, 101 & 151 must minimize the set back of the instrument 39 to prevent a "tunnel" effect. Due to the smaller diameter of the 2¼ inch instruments the bezel 43 may have a smaller thickness to minimize the tunnel effect.

The bezels 43, 101 & 151 design had to provide for an adequate surface to mount the fiber-optic ribbon or fiber ribbon 75 so that it would have adequate support. Bezel 151 allows for the protruding knobs that are on some instruments, such as altimeters and directional gyros. The entry ports 71 and 109 and the openings 71 and 111 are designed to allow for the entry of the fibers 55 without pinching of the individual fibers 87.

It was determined that a 3/16 inch single layer of fiber-optics ribbon 75 would adequately illuminate the 2¼ inch instrument and by using this size ribbon, two 2¼ inch instruments could be illuminated by each light port, therefore increasing the number of instruments lighted by a single bulb within the light source housing 23. The tunneling effect was minimized and an adequate mounting surface for the fiber-optic ribbon 75 was thus made available.

Due to the larger surface area that needed to be illuminated in the 3⅛ inch instruments greater light was needed. The larger diameter of the 3⅛ inch instrument did allow for a greater instrument set-back, without causing a "tunnel effect" which in turn allowed for a wider mounting surface thickness and wider fiber-optic ribbon 75. A ¼ inch wide, double layer, fiber-optic ribbon was determined to provide a very pleasing amount of light and would still allow all the fibers to fit into a single light port, thereby again maximizing the usage of the light port arms 25.

Referring to FIG. 13, an expanded and partially broken away view of the channel support 52 and its printed label 53 are shown. A fiber cable 31 approaches from the left, and begins to extend laterally, begins to fan out to put the fibers of the fiber tape 75 into a flattened tape orientation, as the fiber cable 31/fiber tape 75 enters through a slot 175 at one side of the channel support 52. The slot 175 is ideally as near as possible to one end of the channel support 52 in order to enable as much of the channel support 52 as possible to be used. The approach of the fiber cable 31 will ideally be through the instrument panel, and a matching slot in the instrument panel similar to slot 175 is ideal for hiding the approach of the light source.

As can be seen, the channel support 52 has a series of bilaterally symmetrical stepped surfaces. A pair of parallel outer surfaces 177 are visible to the user, and the color of the plastic used in the extrusion should be chosen with the exposure of this in mind. A second pair of stepped surfaces 179 which are located adjacent the surfaces 177 and nearer the center line provides the area with which the printed label 53 is adhered to the channel support 52. A base floor 181 is provided along the center of the channel support 52 to accommodate the fiber tape 75. The fiber tape 75 and surfaces 179 provide a generally flat surface with which to support the printed label 53 to prevent unevenness.

Referring to FIG. 14, a view along line 14—14 of FIG. 13 illustrates the slot 175 more clearly. Also seen is the outer edge of the surfaces 177, 179, and the base floor 181. Referring to FIG. 15, a view taken along line 15—15 of FIG. 13 illustrates the channel support 52 and the interfitting of the printed label 53 and illustrates the extent to which the printed label 53 is protected and evenly supported across the width of the channel support 52. Also seen is a score 183 in the base floor 181 which facilitates the even division of the channel support 52 in the event that a wider printed label 53 is to be supported. In this event, it may be helpful to add some filler material to lend support to the fiber tape 75. But the score 183 will enable user expansion by simply folding the channel support 52 together along its midline, separating the halves, and mounting them farther apart. This will also help where the labels 53 are odd-sized.

While the present invention has been described in terms of an optical fiber illumination system for both instruments and for illuminating text, one skilled in the art will realize that the structure and techniques of the present invention can be applied to many similar devices. The present invention may be applied in any situation where illumination is needed to be provided as a separate system.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A bezel for a fiber optic illumination system for an instrument comprising:

a body having a main planar portion including a first side and a second side for facing said instrument, said first side having a raised portion surrounding a central aperture, said second side having an accommodation groove and having a first radially inwardly directed surface for fitting over a ring on said instrument, a second radially inwardly directed surface at an innermost extent of said accommodation groove for supporting a fiber optic ribbon.

2. The bezel as recited in claim 1 wherein said second radially inwardly directed surface extends from said first radially inwardly directed surface toward said first side of said body terminating in a lip having a radial surface.

3. The bezel as recited in claim 1 wherein said second radially inwardly directed surface is partially within said raised portion.

4. The bezel of claim 1 wherein said body has an entry port between said first and said second sides and in communication with said second radially inwardly directed surface for accommodating an extension of said fiber optic ribbon from outside said bezel and onto said second radially inwardly directed surface.

5. The bezel of claim 4 wherein said bezel is rectangular in shape and has a side surface extending around said body second radially inwardly directed surface to accommodate transition of optical fibers connected to said optical fiber ribbon from outside said bezel to position on said second radially inwardly directed surface.

6. The bezel of claim 4 wherein said body contains a triangular shaped space between said entry port and said anchoring structure is a pair of spaced apart triangularly shaped members viewed in cross sectional profile.

7. The bezel of claim 1 wherein said body contains an open slot having a pair of opposing parallel side to accommodate a knob on said instrument.

8. The bezel of claim 1 wherein said raised portion has a circumferentially outwardly directed surface having an outer diameter matching an inner diameter of said first radially inwardly directed surface.

9. A fiber optic illumination system comprising:

a light source housing having a plurality of output ports;

an optical fiber cable having a first end connected to said light source housing and a second end;

an instrument bezel having a radially inwardly directed surface supporting a fiber optic ribbon in optical communication with said second end of said optical fiber cable.

10. The fiber optic illumination system of claim 9 wherein said bezel has a central aperture, and entry port through which said optical fiber cable extends.

11. The fiber optic illumination system of claim 9 wherein said radially inwardly directed surface is a second radially inwardly directed surface, and wherein said bezel includes a body having a main planar portion including a first side and a second side for facing an instrument, said first side having a raised portion surrounding a central aperture, said second side having an accommodation groove and having a first radially inwardly directed surface for fitting over a ring on said instrument, said second radially inwardly directed surface at an innermost extent of said accommodation groove for supporting said fiber optic ribbon adjacent a central aperture.

12. The fiber optic illumination system as recited in claim 11 wherein said second radially inwardly directed surface extends from said first radially inwardly directed surface toward said first side of said body terminating in a lip having a radial surface.

13. The fiber optic illumination system as recited in claim 11 wherein said second radially inwardly directed surface is partially within said raised portion.

14. The fiber optic illumination system of claim 11 wherein said bezel is rectangular in shape and has a side surface extending around said body.

15. The fiber optic illumination system of claim 11 wherein said body contains a triangular shaped space between said entry port and said anchoring structure is a pair of spaced apart triangularly shaped members viewed in cross sectional profile.

16. The fiber optic illumination system of claim 11 wherein said body contains an open slot having a pair of opposing parallel side to accommodate a knob on an instrument when said bezel is mounted over said instrument.

17. The fiber optic illumination system of claim 16 and further comprising an instrument and wherein said bezel is attached to said instrument.

18. The fiber optic illumination system of claim 9 and further comprising an elongate channel support having a back side and a front side having a pair of parallel outer surfaces, a pair of stepped surfaces, each adjacent a different one of said pair of parallel outer surfaces, for supporting a printed label, and a base floor surface separating said pair of stepped surfaces, for supporting a fiber tape between said base floor surface and said printed label.

19. The fiber optic illumination system of claim 18 wherein said elongate channel support has an opening in said base floor surface for accommodating entry of said fiber tape onto said base floor surface.

20. The fiber optic illumination system of claim 18 wherein said elongate channel support has an elongate groove along a length thereof for facilitating separation of the channel support to accommodate a wide printed label.

\* \* \* \* \*